United States Patent [19]

Moser

[11] 4,027,360
[45] June 7, 1977

[54] TIE DOWN BRACKETS FOR SECURING BIGHTS OF FLEXIBLE MEMBERS

[76] Inventor: Willard W. Moser, P.O. Box 1503, Guymon, Okla. 73942

[22] Filed: Apr. 27, 1976

[21] Appl. No.: 680,761

Related U.S. Application Data

[63] Continuation-in-part of Ser. No. 431,205, Jan. 7, 1974, Pat. No. 3,889,321, and a continuation-in-part of Ser. No. 564,806, April 3, 1975, Pat. No. 3,973,298.

[52] U.S. Cl. .................................. 24/146; 24/147; 24/236; 24/115 K
[51] Int. Cl.² ..................... A43C 3/00; B21D 53/46
[58] Field of Search .................. 24/146, 236, 115 K, 24/147

[56] References Cited

UNITED STATES PATENTS

| 498,562 | 5/1893 | Hilbrath | 24/236 |
| 1,395,102 | 10/1921 | Gehrke | 24/236 |

*Primary Examiner*—Bernard A. Gelak
*Attorney, Agent, or Firm*—William R. Laney

[57] ABSTRACT

A tie down bracket for receiving and engaging a bight or loop in a flexible member, such as a rope or cable, such tie down bracket including a base plate having secured thereto a spring mounting body. The spring mounting body includes a projecting finger which cooperates with a spring mounted on the body. The spring defines with the base plate an opening adjacent the finger for receiving and retaining the bight or loop of the flexible member.

6 Claims, 6 Drawing Figures

TIE DOWN BRACKETS FOR SECURING BIGHTS OF FLEXIBLE MEMBERS

CROSS REFERENCE TO RELATION APPLICATION

This application is a continuation-in-part of U.S. patent application Ser. No. 431,205 filed Jan. 7, 1974, now U.S. Pat. No. 3,889,321, and also of my copending U.S. application Ser. No. 564,806, filed Apr. 3, 1975, now U.S. Pat. No. 3,973,298.

FIELD OF THE INVENTION

This invention relates to brackets or clips used to easily receive and tenaciously retain a loop or bight portion of a cord, rope, cable or other flexible member. More particularly, the invention relates to brackets particularly adapted for mounting on the sides of trucks or similar vehicles for retaining the ropes or lines used to secure a tarpaulin over the top of the cargo-carrying portion of such vehicles.

BRIEF DESCRIPTION OF THE PRIOR ART

In the transport of cargo in large, open-topped trucks and similar vehicles, it is customary practice to cover the cargo with a removable tarpaulin or similar flexible covering structure. The side edges of the tarpaulin are secured in position after covering the cargo by extending ropes or similar flexible lines from certain points along the side edges of the tarpaulin to a plurality of positions of anchorage along the side walls of the truck. For purposes of anchoring or securing the ropes, it has been conventional practice to provide a cleat or similar rigid structure having projecting fingers or toes beneath which the bights or loops of the rope are passed prior to tensioning. A difficulty frequently encountered with this type of securing or anchoring means is that the rope employed for securing the tarpaulin often develops slack or looseness after an extended period of road travel with characteristic vibration, and the loops, by reason of sagging of the rope, pass free of the anchoring cleats or similar structure, and thus no anchoring function continues to be rendered by these devices.

In other types of anchoring structures or brackets employed for securing the bight portions of ropes, a latching mechanism is sometimes employed which is complicated to operate, and requires digital manipulation in order to open the bracket to receive the bight of the rope or the flexible member, followed by further digital manipulation to lock the bracket in place around or over the bight of the rope. In a few instances, the brackets used employ rigid eyes through which the rope must first be threaded in order to place the bight in position in the eye, thus necessitating a free end of the rope which can be manipulated to effect initial threading of the rope through the eye. Where such free end is not available and only the bight is accessible, such devices have no utility, since there is no way to place the bight within the rigid eye.

BRIEF DESCRIPTION OF THE PRESENT INVENTION

The present invention provides an improved tie down bracket for quickly and easily receiving the bight portions or loops formed in ropes which are to be drawn taut from an anchor point established at the point of the bracket. The brackets of the invention are simple in construction, but are reliable in use, and can be employed by unskilled personnel having ordinary digital facility.

Broadly described, the tie down bracket of the invention comprises a base plate adapted for securement to a supporting surface, and having mounted thereon a solid spring mounting or supporting body. The spring supporting body includes a projecting retaining finger which is spaced from the base plate. Spring means is mounted on the spring supporting body between the finger and the base plate and provides guide surfaces inclined away from the base plate. In some types of mounting of the bracket, it is possible to eliminate the base plate from the structure.

In the use of the tie down brackets of the invention, a bight or loop portion of a flexible member, such as a rope, is guided beneath the portion of the spring means between the finger and the base plate by initial contact with a surface of the spring means inclined away from the base plate. As a result of the resiliency of the spring means, the bight can be snapped into the space defined between the finger and the base plate. The flexible member is retained in this position by the confining physical limitation to movement constituted by the spring means and thus cannot be released from the tie down bracket at such time as slackness may develop in the flexible member.

An important object of the invention is to provide a tie down bracket which is relatively simply in construction, includes few principle parts and which is mechanically sturdy and therefore characterized in having a long and trouble-free operating life.

A further object of the invention is to provide a tie down bracket capable of functioning as an anchoring device for securing the loop or bight portion of an elongated flexible member, such as a rope, and to retain such loop or bight portion in a fixed location, even though the rope is slackened and relieved from a status of tension.

An additional object of the invention is to provide a tie down bracket which is simply constructed so that inexperienced personnel having no more than average perception and mechanical ability can use the bracket without experiencing difficulty, and without failing to understand how the flexible member is to be secured by means of te bracket.

Additional objects and advantages will become apparent as the following detailed description of a preferred embodiment of the invention is read in conjunction with the accompanying drawings which illustrate the invention.

DETAILED DESCRIPTION OF PREFERRED EMBODIMENT OF THE INVENTION

Figure 1:
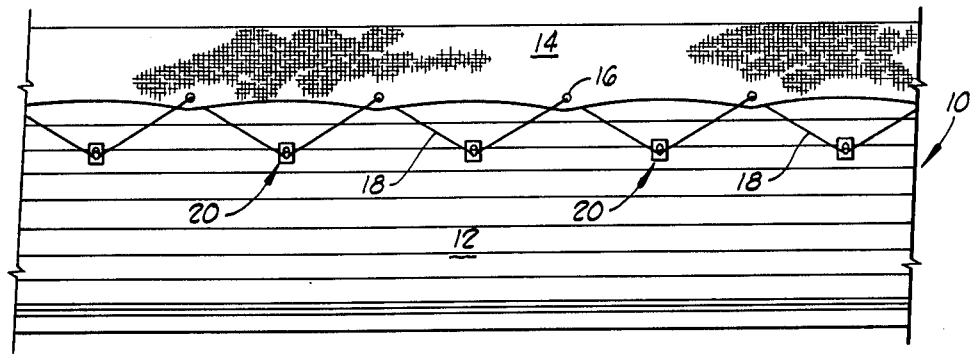
FIG. 1 is a side elevation view showing a portion of an open-topped, cargo-carrying truck, and illustrating a tarpaulin being positioned over the open top of the truck bed and secured in this position by means of a rope which is anchored or tied down by means of the tie down brackets of the present invention.

Referring initially to FIG. 1 of the drawings, shown therein is a portion of a truck bed designated generally by reference numeral 10 and including said boards 12 forming the sid of the bed. A type of truck of which a portion is illustrated in FIG. 1 is an open-topped truck adapted to carry cargo protected by a tarpaulin or similar protective member, and such tarpaulin is designated by reference numeral 14. As in conventional construction, the tarpaulin is provided with a plurality of grommet lined eyes or apertures 16 for the purpose of receiving an elongated flexible member, such as a rope 18, which is extended along the side edge of the tarpaulin. The rope 18 is anchored and maintained in tension by providing a series of loops or bights between the grommetted eyes 16 and spaced below the side edge of the tarp, with these loops or bights being engaged by some type of anchoring structure or bracket.

In FIG. 1 of the drawings, the tie down brackets of the present invention are illustrated as in use for engaging and anchoring the bights of the rope 18, and are designated generally by reference numeral 20. The details of structure of the tie down bracket 20 of the invention are illustrated in FIGS. 2–6. The tie down bracket 20 preferably includes a base plate 22 which is apertured as shown at 21 to allow bolts, screws or other fastening devices to be extended therethrough The base plate 22 has a spring supporting body 23 mounted thereon by means of a first rivet 24 and a second rivet 25. The spring supporting body 23 includes a dished-out central portion 28 which is arcuately shaped to provide an exposed surface curving outwardly from the base plate 22 toward a central portion of the body, which central portion is the thickest portion of the body. The spring supporting body 23 has a flat back surface 29 which abuts the base plate 22.

Figures 2, 3, 4:
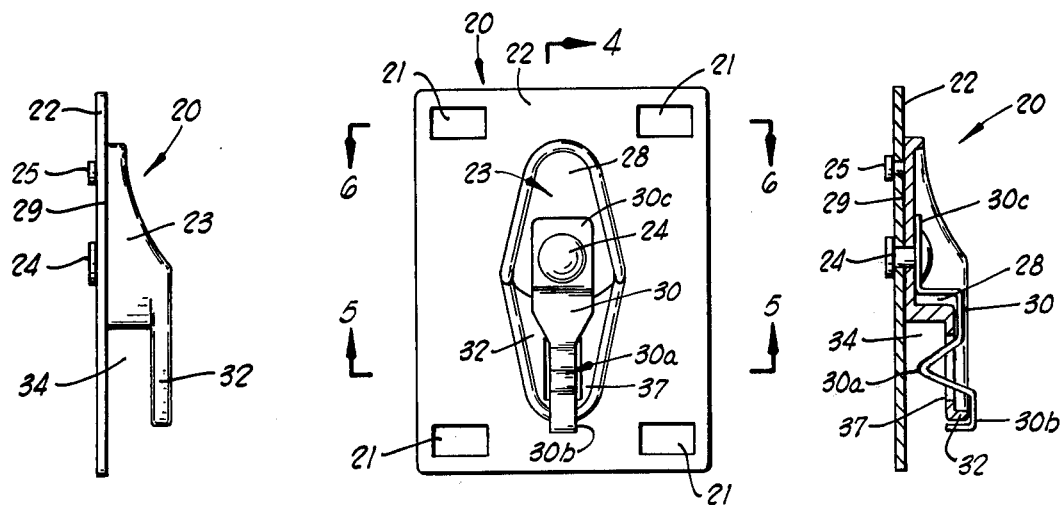
FIG. 2 is a side elevation view illustrating the tie down bracket of the present invention as such bracket appears when viewed from the side thereof.
FIG. 3 is a front elevation view of the tie down bracket shown in FIG. 2.
FIG. 4 is a sectional view taken along line 4—4 of FIG. 3.
Figure 5:
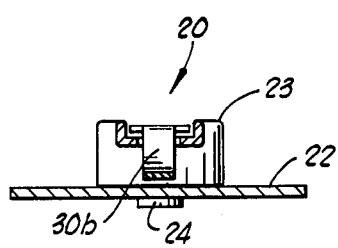
FIG. 5 is a sectional view taken along line 5—5 of FIG. 3.
Figure 6:
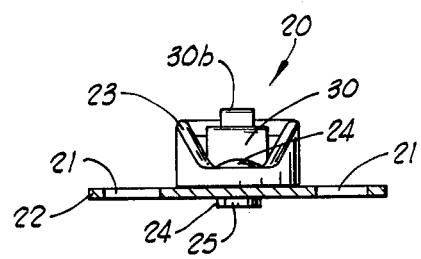
FIG. 6 is a sectional view taken along line 6—6 of FIG. 3.

The body 23 further includes a projecting retainer finger 32 which projects substantially parallel to the base plate 22 and to the flat back surface 29 and defines with the base plate, a retainer space 34. As best shown in FIGS. 3 and 4, an opening 37 is provided in the retainer finger 32 through which a portion 30a of the spring plate 30 projects into the space 34 between the finger 32 and the base plate 22. As best shown in FIG. 4, the portion 30a of the spring plate 30 is preferably substantially V-shaped in configuration when viewed from the side, so that a pair of contiguous guide surfaces, inclined away from the base plate in opposite directions, are provided thereby. One of these surfaces faces the interior of the retainer space 34, and the other faces outwardly from the retainer space. When a flexible member forceably contacts either of the surfaces with the force acting parallel to the plate 22, the portion 30a of the spring plate 30 is displaced away from the base plate 22.

Still referring to FIG. 4, it will be noted that one end 30b of the spring plate 30 is shaped to hook over the free end of the finger 32 so that as a force acts to move the portion 30a of the spring plate 30 away from the base plate 22, the end portion 30b of the spring member 30 is free to move away from the end of the finger 32. The opposite end 30c of the spring plate 30 is detachably secured to the supporting body 23 by the first rivet or fastening device 24, and is connected to the V-shaped portion 30a by two reverse right angle bends.

In utilizing the tie down bracket 20 of the invention, the bight of a rope or other flexible member is first passed beneath the outer, free end of the retainer finger 32 into contact with the V-shaped portion 30a of the spring 30. The rope is then pulled so as to force the bight against and beneath the spring plate 30 at the point where the spring plate 30 is closest to the base plate 22. The rope is tensioned so that the bight portion is drawn into the retainer space 34 between the retainer finger 32 of the spring supporting body 23 and the base plate 22. In the use of the tie down brackets 20 for securing the side edges of a tarpaulin 14 over cargo carried in a truck, a series of the tie down brackets are secured in spaced relation along the side of the truck by extending suitable fastening members (not shown) through the openings or apertures formed in the base plate 22. A series of bights formed in the rope of flexible member between the grommetted eyes 16 of the tarpaulin are then placed in anchored or secured position in the spaces 34 formed beneath the retaining fingers 32 of each of the tie down brackets 20, and the rope is then tensioned by pulling on one end of it to draw the tarp 14 down tightly to the status illustrated in FIG. 1.

It should also be pointed out that in some occasional uses, the base plate 22 can be eliminated and the spring supporting body 26 can be riveted or otherwise fastened to the side of a truck or other flat supporting surface.

Although certain preferred embodiments of the invention have been herein described in order to illustrate the basic principles upon which the invention is based, it will be understood that some variations and changes in the actual and specific structures illustrated and described in referring to such specific embodiments may be effected without departure from these basic principles. Changes and innovations of this type are therefore deemed to be circumscribed by the spirit and scope of the invention, except as the same may be necessarily limited by the appended claims or reasonable equivalents thereof.

What is claimed is:

1. A tie down bracket, comprising:
  a base plate;
  a spring-supporting body secured to said base plate and including:
    a flat back surface abutting said base plate;
    a dished-out portion;
    a central portion; and
    an apertured retainer finger projecting as a cantilever from said central portion or the opposite side thereof from said dished-out portion and extending parallel to said base plate and spaced therefrom; and
  an elongated spring plate having:
    a first end secured to said spring supporting body in the dished-out portion thereof and on the opposite side thereof from said flat back surface;
    a second end hooked over the free end of said retainer finger; and
    a V-shaped portion between said ends projecting through the aperture in said retainer finger and defining with said base plate and with the central portion of said spring supporting body, a retainer space for retaining the bight of a flexible member.

2. A tie down bracket as defined in claim 1 and further characterized as including fastening means extending through said spring plate adjacent said first end, through said dished-out portion of said spring supporting body and through said base plate.

3. A tie down bracket as defined in claim 1 wherein said spring plate defines a pair of right angle bends in which the two right angles included thereby are located on opposite sides of said spring plate from each other, and said right angle bends are located between said first end and said U-shaped portion of said spring plate.

4. A tie down bracket comprising:
 a spring supporting body adapted for securement to a base structure and including:
  a flat back surface for abutting contact with a substantially monoplanar surface of such base structure upon which said spring supporting body is mounted;
  a dished-out portion;
  a central portion;
  an apertured retainer finger projecting as a cantilever from said central portion on the opposite side thereof from said dished-out portion and extending parallel to said base plate and spaced therefrom; and
 an elongated spring plate having:
  a first end secured to said spring supporting body in the dished-out portion thereof and on the opposite side thereof from said flat back surface;
  a second end hooked over the free end of said retainer finger; and
  a reverse bent bight portion between said ends projecting through the aperture in said retainer finger and defining with said base plate and with the central portion of said spring supporting body, a retainer space for retaining the bight of a flexible member.

5. A tie down bracket as defined in claim 4 and further characterized as including fastening means extending through said spring plate adjacent said first end and through said dished-out portion of said spring supporting body.

6. A tie down bracket as defined in claim 4 wherein said spring plate defines a pair of right angle bends in which the two right angles included thereby are located on opposite sides of said spring plate from each other, and said right angle bends are located between said first end and said reverse bent bight portion of said spring plate.

* * * * *